US009542736B2

(12) United States Patent
Bhardwaj et al.

(10) Patent No.: US 9,542,736 B2
(45) Date of Patent: Jan. 10, 2017

(54) EVALUATING IMAGE SHARPNESS

(71) Applicant: PayPal, Inc., San Jose, CA (US)

(72) Inventors: Anurag Bhardwaj, Sunnyvale, CA (US); Wei Di, San Jose, CA (US); Robinson Piramuthu, Oakland, CA (US); Neelakantan Sundaresan, Mountain View, CA (US); Nate Lyman, Livermore, CA (US)

(73) Assignee: PAYPAL, INC., San Jose, CA (US)

( * ) Notice: Subject to any disclaimer, the term of this patent is extended or adjusted under 35 U.S.C. 154(b) by 4 days.

(21) Appl. No.: 14/073,788

(22) Filed: Nov. 6, 2013

(65) Prior Publication Data
US 2014/0355881 A1    Dec. 4, 2014

Related U.S. Application Data

(60) Provisional application No. 61/830,951, filed on Jun. 4, 2013.

(51) Int. Cl.
*G06K 9/34* (2006.01)
*G06T 7/00* (2006.01)

(52) U.S. Cl.
CPC ... *G06T 7/0002* (2013.01); *G06T 2207/10024* (2013.01); *G06T 2207/20076* (2013.01); *G06T 2207/30168* (2013.01)

(58) Field of Classification Search
CPC .............. G06T 7/0081; G06T 7/0002; G06T 2207/10024; G06T 2207/00076; G06T 2207/30168; G06K 9/40; H04N 5/23248

(Continued)

(56) References Cited

U.S. PATENT DOCUMENTS 6,717,612 B1* 4/2004 Matsumura ........... G01S 3/7865
                                                          348/155
2003/0095270 A1* 5/2003 Guo et al. ...................... 358/1.9
(Continued)

FOREIGN PATENT DOCUMENTS

WO     WO-2014197111 A1    12/2014

OTHER PUBLICATIONS

Chen et al., "No-reference image blur assessment using multiscale gradient", Journal on Image and Video Processing 2011, 2011:3, pp. 1-11.*

(Continued)

*Primary Examiner* — Mekonen Bekele
(74) *Attorney, Agent, or Firm* — Maschoff Brennan

(57) ABSTRACT

A system may be configured to calculate and use image sharpness results. In some example embodiments, a content-aware image sharpness evaluation scheme is implemented by the system to calculate the degree of sharpness or blur of photographs taken of objects of interest. In certain example embodiments, a calculated sharpness score from the image sharpness evaluation scheme is converted into a score that is meaningful relative to other photographs of the same category as the object depicted in the photograph. In various example embodiments, a mobile-based assistant is configured to provide instant (or near instant) feedback to users uploading photographs using a mobile device. In alternative example embodiments, a web-based assistant is configured to provide instant (or near instant) feedback to users uploading one or more photographs simultaneously to an electronic commerce or marketplace website.

20 Claims, 21 Drawing Sheets
(15 of 21 Drawing Sheet(s) Filed in Color)

(58) Field of Classification Search
USPC .............. 382/266, 190, 173; 348/207.1, 208
See application file for complete search history.

(56) References Cited

U.S. PATENT DOCUMENTS

| | | | |
|---|---|---|---|
| 2005/0025364 A1* | 2/2005 | Kim et al. ................... 382/190 |
| 2005/0162671 A1* | 7/2005 | Illmann ................ G06T 15/005 358/1.2 |
| 2005/0185836 A1 | 8/2005 | Huang |
| 2006/0082846 A1* | 4/2006 | Sakakibara et al. .......... 358/518 |
| 2008/0266406 A1* | 10/2008 | McLeod ............ H04N 5/23248 348/208.16 |
| 2012/0281005 A1* | 11/2012 | Nystad .................. H04N 19/90 345/582 |
| 2013/0089257 A1* | 4/2013 | Kim ..................... G06T 1/0028 382/170 |
| 2013/0121610 A1* | 5/2013 | Chen et al. ................... 382/266 |
| 2013/0169827 A1* | 7/2013 | Santos et al. ............. 348/207.1 |

OTHER PUBLICATIONS

Crete, Frederique, et al., "The blur effect: perception and estimation with a new no-reference perceptual blur metric", Proc. SPIE 6492, Human Vision and Electronic Imaging XII, (Feb. 12, 2007), 649201.

Larson, Eric C, et al., "Most apparent distortion: a dual strategy for full-reference image quality assessment", Proc. SPIE 7242, Image Quality and System Performance VI (Jan. 19, 2009), 72420S.

Narvekar, N. D, et al., "A no-reference perceptual image sharpness metric based on a cumulative probability of blur detection", International Workshop on Quality of Multimedia Experience, 2009. QoMEx 2009., (2009), 87-91.

Narvekar, Niranjan, et al., "An Improved No-Reference Sharpness Metric Based on the Probability of Blur Detection", Proceedings of the Fifth International Workshop on Video Processing and Quality Metrics for Consumer Electronics, VPQM-2010, (2010), 5 pgs.

Wang, Z., et al., "No-reference perceptual quality assessment of JPEG compressed images", 2002 International Conference on Image Processing. 2002. Proceedings, vol. 1, (2002), 1-477-1-480.

"International Application Serial No. PCT/US2014/032078, International Preliminary Report on Patentability mailed May 21, 2015", 9 pgs.

"International Application Serial No. PCT/US2014/032078, International Search Report mailed Aug. 22, 2014", 2 pgs.

"International Application Serial No. PCT/US2014/032078, Written Opinion mailed Aug. 22, 2014", 5 pgs.

Chen, M, et al., "No-reference image blur assessment using multiscale gradient", Journal on Image and Video Processing; Publication, [Online]. Retrieved from Internet: <http://jivp.eurasipjournals.com/content/pdf/1687-5281-2011-3.pdf>, (Jul. 21, 2014), 1-11.

Marziliano, Pina, et al., "A No-Reference Perceptual Blur Metric", Image Processing, vol. 3, No., pp. III-57,III-60 vol. 3, [Online]. Retrieved from Internet: <http://ieeexplore.ieee.org/xpl/articleDetails.jsp?>, (Jul. 21, 2014), 1 pg.

* cited by examiner

Examples of Common Types of Blur (a) Original image, (b) Image is converted to gray image, (c) Edge map by Sobel from horizontal direction, (d) Edge map from Sobel from vertical direction From left to right, Edge Energy Map, Weight Map, Normalized Weight Map (Sigma=3)

Algorithm and System Flowchart. Numbers indicate formula used in each operation.

Examples of sharpness (Shrp) and corresponding estimated Probabilities of blur (Pblr).
Ground truth of Sharpness level: (a)>(b)>(c)>(d)>(e)>(f)

Examples of sharpness (Shrp) and corresponding estimated Probabilities of blur (Pblr).
Ground truth of Sharpness level: (a)>(b)>(c)>(d)>(e)

Shrp=0.8143;　　　　　　Shrp=0.8283;
Pblr=0.3798;　　　　　　Pblr=0.3512;

Shrp=0.7399;　　　　　　Shrp=0.8036;
Pblr=0.5320;　　　　　　Pblr=0.4017;

Examples of sharpness (Shrp) and corresponding estimated Probabilities of blur (Pblr) for different images of the same object Examples from women's clothing category as evaluated by Blur Metric. Sharpness score and probability of blur are displayed under each image. Score (Shrp) of 1 represents the most sharp and 0 the most blur.

Bar plot of nDCG for different algorithms at 4 ranking positions: 1100, 1600, 2100, and 2600

Flow and Screenshot of a Mobile Photo Assistant

Annotated Screenshot of a Web-based Photo Assistant

File Upload

File name: [Choose File] No file chosen
[Submit]

---

Results

Item ID : 160678745060
Sharpness (0-blur, 1-sharp) : 0.36676
Probability of Blur : 0.93451

Example of a blurred image being uploaded and an image sharpness evaluation result being displayed to the user

File Upload

File name: [Choose File] No file chosen
[Submit]

Results

Item ID :                       26089621846S
Sharpness (0-blur, 1-sharp) : 0.38312
Probability of Blur :           0.93159

Example of a blurred image being uploaded and an image sharpness evaluation result being displayed to the user

File Upload

Example of a blurred image being uploaded and an image sharpness evaluation result being displayed to the user

File Upload

File name: [Choose File] No file chosen
[Submit]

Results

Item ID : 390302917983
Sharpness (0-blur, 1-sharp) : 0.86050
Probablity of Blur : 0.28535

Example of a blurred image being uploaded and an image sharpness evaluation result being displayed to the user Comparison of two images for the same product listing (File 01 and File 02, with resulting image sharpness evaluations. The image File 02 is the sharper of the two images.

EVALUATING IMAGE SHARPNESS

RELATED APPLICATION

This application claims the priority benefit of U.S. Provisional Patent Application Ser. No. 61/830,951, filed Jun. 4, 2013, which is incorporated herein by reference in its entirety.

TECHNICAL FIELD

The subject matter disclosed herein generally relates to the processing of data. Specifically, the present disclosure addresses systems and methods to facilitate evaluation of image sharpness.

BACKGROUND

Images can be used to convey information more efficiently or in a way not possible with text, particularly from the viewpoint of a user viewing the images or to facilitate electronic commerce (e-commerce). The extent to which information can be conveyed using images is related to image quality. Amateur or occasional sellers may not possess professional skills that would enable them to take quality photos of their products. One of the common image quality problems is photo blurriness (lack of sharpness).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are illustrated by way of example and not limitation in the figures of the accompanying drawings.

DETAILED DESCRIPTION

Various modifications to the example embodiments discussed herein will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present disclosure is not intended to be limited to the embodiments shown, but is to be accorded the widest scope consistent with the principles and features disclosed herein. The headings provided herein are for convenience only and do not necessarily affect the scope or meaning of the terms used.

Figure 1:
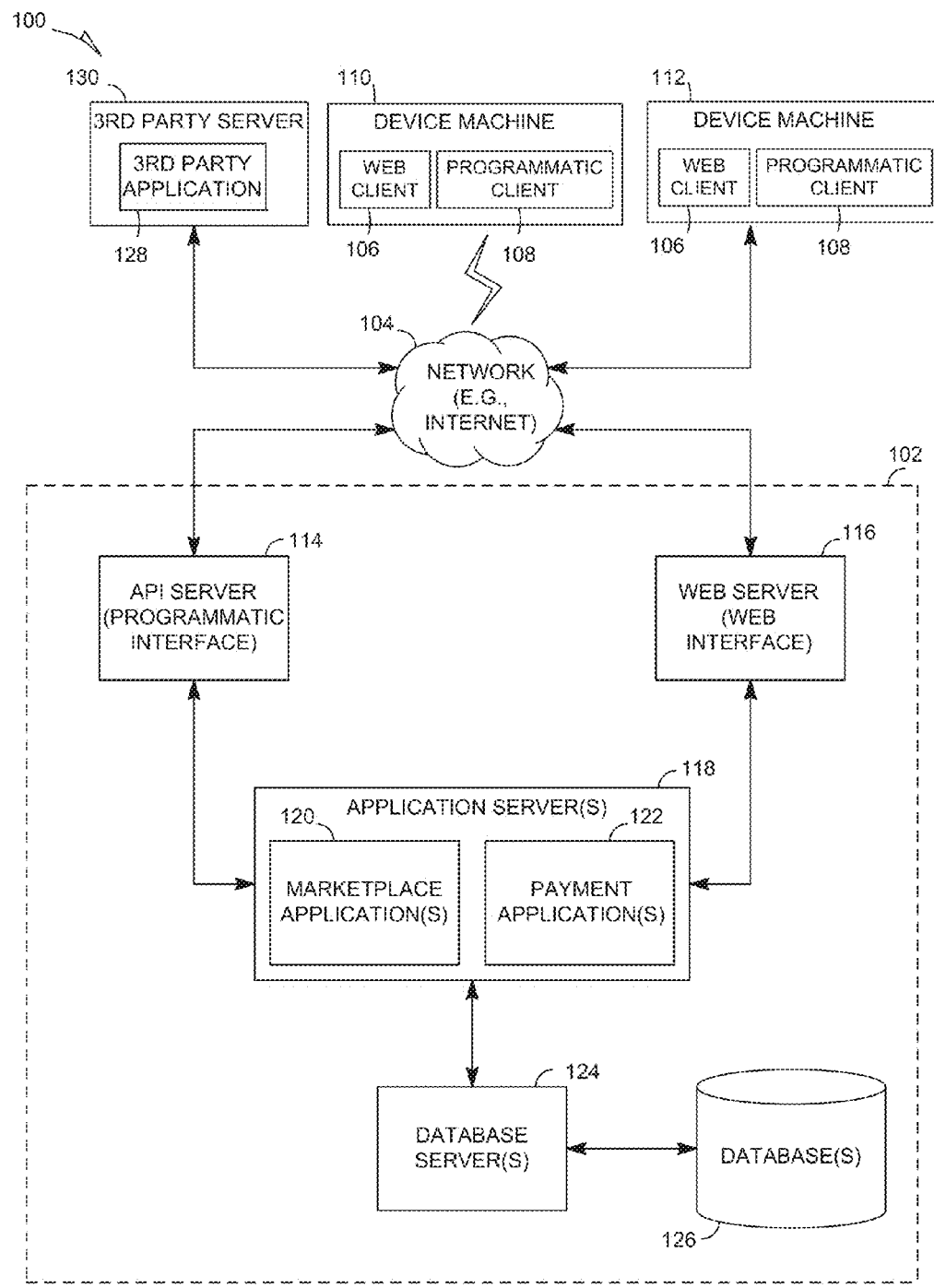
FIG. 1 is a block diagram depicting a network architecture of a system, according to some example embodiments, having a client-server architecture configured for exchanging data over a network.

FIG. 1 is a network diagram depicting a network system 100, according to one embodiment, having a client-server architecture configured for exchanging data over a network. A networked system 102 (e.g., a sharpness evaluation machine configured to evaluate image sharpness) may be or include a network-based publication system that provides server-side functionality, via a network 104 (e.g., the Internet or wide area network (WAN)), to one or more clients and devices. FIG. 1 further illustrates, for example, one or both of a web client 106 (e.g., a web browser) and a programmatic client 108 executing on device machines 110 and 112. In one embodiment, the network system 100 comprises a marketplace system. In another embodiment, the network system 100 comprises other types of systems such as, but not limited to, a social networking system, a matching system, a recommendation system, an electronic commerce (e-commerce) system, a search system, and any suitable combination thereof.

Each of the device machines 110 and 112 may be or include a computing device that includes at least a display and communication capabilities with the network 104 to access the networked system 102 (e.g., an image sharpness evaluation machine). Examples of the device machines 110 and 112 include, but are not limited to, remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and any suitable combination thereof. Each of the device machines 110 and 112 may connect with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the device machines 110 and 112 includes one or more applications (also referred to as "apps") such as, but not limited to, a web browser, messaging application, electronic mail (email) application, an c-commerce site application (also referred to as a marketplace application), and the like. In some example embodiments, if the e-commerce site application is included in a given one of the device machines 110 and 112, then this e-commerce site application is configured to locally provide a user interface and at least some of the functionalities of the e-commerce site, with the e-commerce site application being configured to communicate with the networked system 102, on an as needed basis, for data or processing capabilities not locally available (such as access to a database of items available for sale, to authenticate a user, to verify a method of payment, etc.). Conversely if the e-commerce site application is not included in a given one of the device machines 110 and 112, the given one of the device machines 110, 112 may use its web browser to access the c-commerce site (or a variant thereof) hosted on the networked system 102. Although two device machines 110 and 112 are shown in FIG. 1, more or less than two device machines can be included in the system 100.

An application program interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of e-commerce functions and services to users that access networked system 102. E-commerce functions or services may include a number of publisher functions and services (e.g., search, listing, content viewing, payment, etc.). For example, the marketplace applications 120 may provide a number of services and functions to users for listing goods or services, or offers for goods or services for sale, searching for goods or services, facilitating transactions, and reviewing or providing feedback about transactions and associated users. Additionally, the marketplace applications 120 may track and store data and metadata relating to listings, transactions, or user interactions. In some embodiments, the marketplace applications 120 may publish or otherwise provide access to content items stored in application servers 118 or databases 126 accessible to the application servers 118, the database servers 124, or both. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102. In other embodiments, the payment applications 122 may be omitted from the network system 100. In some embodiments, at least a portion of the marketplace applications 120 may be provided on one or more of the device machines 110 and 112.

Further, while the network system 100 shown in FIG. 1 employs a client-server architecture, embodiments of the present disclosure is not limited to such an architecture, and may equally well find application in, for example, a distributed or peer-to-peer architecture system. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
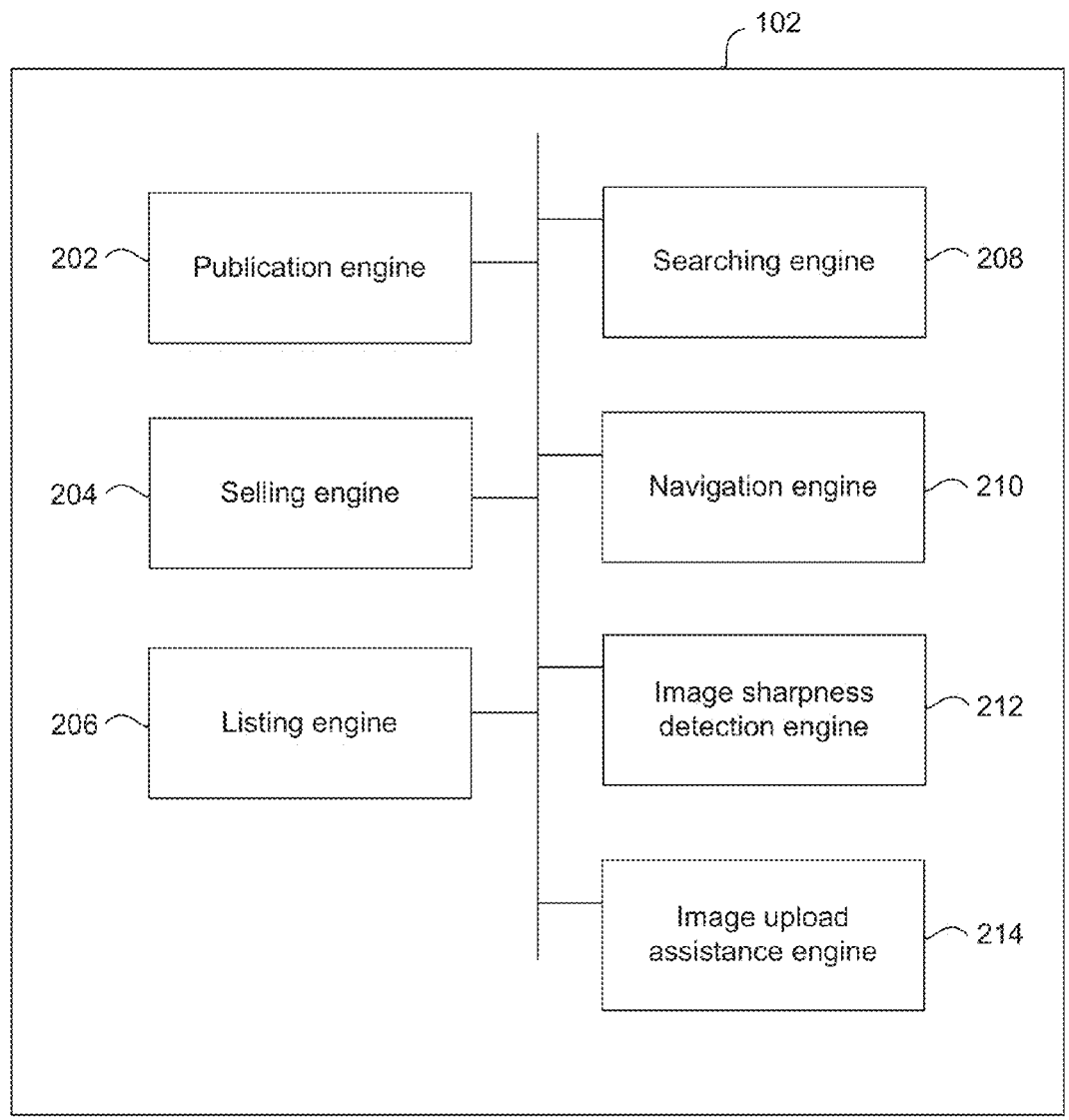
FIG. 2 is a block diagram showing components provided within the system of FIG. 1, according to some example embodiments.

FIG. 2 illustrates a block diagram showing components provided within the networked system 102, according to some example embodiments. The networked system 102 may be or include a sharpness evaluation machine (e.g., a server machine configured by one or more software modules). The networked system 102 may be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124.

The networked system 102 may provide a number of publishing, listing, or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name-value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price (with or without discount) for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110 or 112) of the user. The searching engine 208 may record the query (e.g., keywords) and any subsequent user actions and behaviors (e.g., navigations, selections, or click-throughs).

The searching engine 208 also may perform a search based on a location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify, as part of the search query, a radius or distance from the user's current location to limit search results.

The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

Additional modules and engines associated with the networked system 102 are described below in further detail. It should be appreciated that modules or engines may embody various aspects of the details described below. For instance, an image sharpness detection engine 212 (also referred to as an image sharpness diagnosis engine, an image blurriness detection engine, or an image blurriness diagnosis engine) and an image upload assistance engine 214 may be included in the networked system 102 or any one or more of the device machines 110 or 112 (e.g., client machines) to perform the functions and operations described below.

Quality images in e-commerce improve user engagement and conversion rate. In a consumer-to-consumer (C2C) e-commerce environment, for example, sellers may not possess the professional skills to take good quality photos of their products. One of the common quality problems is photo blur. When blurry photos of products are uploaded to the e-commerce system by sellers, the likelihood of selling such products decrease. Accordingly, the present discussion proposes the following to evaluate image quality or to facilitate users in uploading quality images to an online-based system, such as an online e-commerce or marketplace system. Example embodiments of systems and methods discussed herein may implement a content-aware image sharpness evaluation algorithm and use such an algorithm to facilitate real-time (or near real-time) assistance in image uploading (e.g., photo uploading).

When performing image sharpness diagnosis, example embodiments of systems and methods discussed herein may factor in the content depicted in the image. For example, when a large portion of an image comprises a solid region (e.g., solid color), the image tends to indicate fewer high frequency signals than patterned or non-solid regions.

Example embodiments of systems and methods discussed herein may provide instant feedback on the image quality to the user when the user uploads the image (e.g., during product listing process). Such real-time (or near real-time) feedback prevents or discourages users from publishing blurry images. Absent the feedback feature, use of blurry images as the visual representation of a product may potentially reduce trust by potential buyers as the information is fuzzy and details of the product are lost.

The image sharpness diagnosis (also referred to as the image blurriness detection), according to various example embodiments of systems and methods discussed herein, may be a software-based or web-based detection scheme that is not tied to a particular camera or other hardware.

An image may have a profound impact on e-commerce. It may be used to convey information more efficiently or in a way not possible with text, particularly from the viewpoint of a user viewing the images or to facilitate e-commerce.

However, in many C2C e-commerce sites, sellers do not possess the professional photography skills or the tools that would enable them to take high quality product images. Poor pictures may cause poor buyer experiences or poor seller conversion, and, in turn, may be a poor reflection of the e-commerce site as a trustworthy marketplace. Among many photo quality problems, blurriness (e.g., lack of sharpness) is one that often occurs, especially with more and more people using mobile devices or other portable devices (e.g., iPhone, iPad, smartphones, tablets) to take photos. More and more sellers update or create their product listings through mobile apps and take pictures of their product using their mobile devices. Although such use of mobile apps and devices is a much more convenient way to update or create product listings, associated blurring problems are more often encountered for those images than for images captured using a traditional camera. Images with blur effect may lead to a loss of high frequency information, which can make it harder for buyers to see the details of a product, and thus may cast doubt on the quality of the product. Some guidance and instruction can help a seller to evaluate his or her uploaded photos and also make the right decision as to which photo should be displayed as the main image when a plurality of photos are uploaded for a given product listing.

Accordingly, a Weighted Blur Metric may be implemented to evaluate the sharpness of the photo, and an automatic photo evaluation system may be configured to provide the user immediate feedback of the image quality regarding blur effect. This may be especially useful for helping sellers to maintain a high standard of the visual representation of their product in an electronic environment.

Section 1 introduces the background of non-reference blur analysis. Section 2 proposes a method of evaluating sharpness of a photo. Experimentations on different datasets are included in Section 3. Section 4 presents the web and mobile photo evaluation systems, e.g., the automatic photo evaluation and upload assistance system.

1. Overview of Non-Reference Blur and Sharpness

Figure 3:
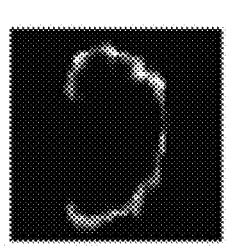
FIG. 3 is a set of example images that demonstrate various forms of kernel for modeling blur, according to some example embodiments.
Figure 3:
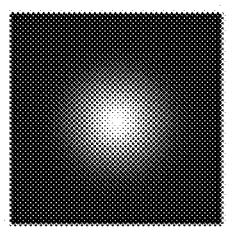
Figure 3:
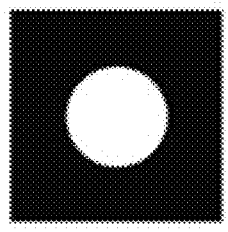
Figure 3:
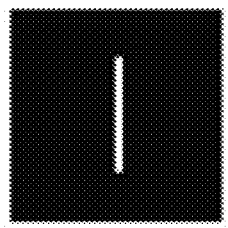
Figure 4:
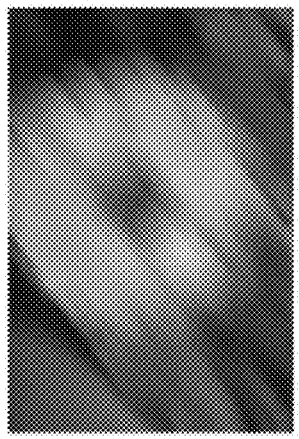
FIG. 4 is a set of example images that demonstrate various types of blur, according to some example embodiments.
Figure 4:
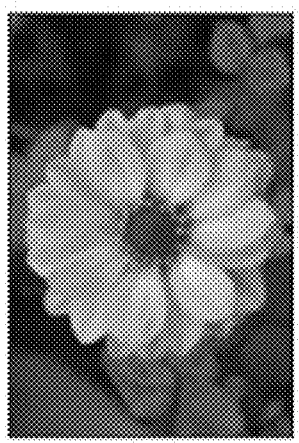
Figure 4:
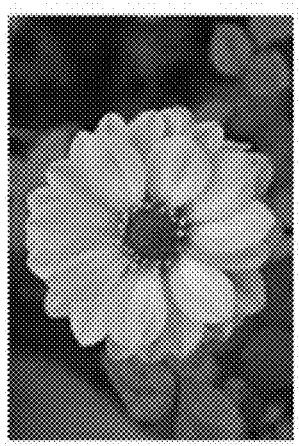

One of the aspects of a product photo is its ability to faithfully represent the product or scene. The words "product," "item," "scene", "object," or the like may be used interchangeably herein to denote the image content. An image appears blurred when its high spatial frequency values in the spectrum are attenuated. Therefore, it causes the loss of the high frequency content, which reduces the sharpness and contrast of the image. Blur effect can be modeled using different kernel functions convoluted with the image. Thus, scene information of one pixel "spills over" to neighboring pixels. High contrast edges in a scene become gradual transitions and fine details are blurred or may even become invisible. FIG. 3 shows several types of kernel for modeling the blurring process, according to some example embodiments. FIG. 4 shows a real image example and examples of the same image for two different types of blur, an out of focus blur and motion blur, according to some example embodiments. Common causes of blur include, but are not limited to, motion blur, out-of-focus blur, image compression, etc.

Motion blur is caused by relative motion of an object or relative motion of the camera during exposure time. Linear motion blur can be thought of as smearing in only one direction, while non-linear involves smearing in multiple directions at different strengths. Even small amounts of motion blur significantly degrade performance, invariant to the direction of the blur. Out-of-focus blur refers to a translation along the optical axis away from the plane or surface of best focus, so the incoming light is smeared out. In general, defocus occurs when the focal point is outside the "depth of field" of the object to be captured. The further an object is from this depth of field the higher the degree of defocus. Defocused blur corresponds to convolve the image using a disk kernel, which can be approximated by Gaussian Blur. The difference is the Gaussian blur using the Gaussian kernel has unlimited support.

Non-reference photo quality evaluation means there is no existing perfect ground truth photo as reference to measure the degree of distortion. Therefore, estimation has to depend solely on the image to be evaluated. Non-reference blur evaluation has been a very difficult problem through the decades. Also, content aware evaluation is even harder due to the lack of reference data. Comparison of pairs of images that have different content is more reasonable if both of the images have similar behavior in the frequency domain. Natural scene images generally have quite a different distribution as compared to man-made objects.

2. Image Sharpness Evaluation Scheme

According to various example embodiments, a sharpness evaluation machine may be configured (e.g., by one or more software modules) to help a seller (e.g., seller user) to understand whether his or her images are below a certain level of sharpness, which may cause a perceived loss in detailed information of the seller's product. A Blur Metric may be implemented by the sharpness evaluation machine based on an observation that humans have difficulties perceiving differences between a blurred image and the same re-blurred image. The Blur Metric may utilize the discrimination between different levels of blurriness perceptible in the same picture to estimate blur annoyance.

However, although this Blur Metric performs well for evaluating images that contain similar content, this Blur Metric may be less optimal for images with different content relative to each other, due to the intrinsic differences in their frequency levels. Unlike most natural scenery images, product images generally have fewer variations in terms of both color and texture. For example, a product image of a black iPad or a black dress may only contain white and black colors, and most of the areas may be solid and without texture. In such a case, high frequency signals only occur at the edges of the product versus its background. In solid regions, pixels are similar to their surrounding regions, and the re-blurring schema used in the Blur Metric may have difficulty extracting useful signals, and instead they treat these solid regions as blurred regions because of its low frequency nature. In some situations, this may lead to false alarms by the Blur Metric, caused by the intrinsic low frequency content of the image.

To solve this problem, a Weighted Blur Metric may be implemented, which adaptively includes edge content information from the image. The algorithm for the Weighted Blur Metric may properly normalize the blur signal from each local region of the image by focusing more on the edges of the image, rather than the solid regions. By doing so, the problem described above can be addressed to reduce the false alarms caused by the intrinsic low frequency image content. A blur detector may also be implemented by modeling the quantitative output of the Weighted Blur Metric and calculating the probability (e.g., chance) of an image being blurred. Finally a blur detection and photo assistant system may be configured (e.g., built) including both web and mobile interfaces. The system may be configured to analyze any uploaded image, and flag the blurred images to help customers (e.g., sellers), particularly in their selling process in an e-commerce environment.

According to various example embodiments of the Weighted Blur Metric, a given image is first converted to grayscale according to the function: I=0.2989R+0.5870G+0.1140B, where R, G, and B are the red, green, and blue color components of the image. Because image content varies across different regions and patches, to capture local sharpness level, the image is first divided into multiple small rectangular regions. Variable m is the number of blocks across the horizontal axis and vertical axis, with the total number of patches generated is $m^2$. For each individual patch (i,j), where (i,j) is the index for the patch ($1 \leq i \leq m$, $1 \leq j \leq m$), let Blur(i,j) denote the blur score computed by the Blur Metric. For example, each patch (i,j) may be 15×15 pixels, 20×20 pixels, or the like.

To compute the weighting matrix W, the image may first be transformed to a grayscale image, and then filtered by Sobel operations from the horizontal and vertical directions separately. Let $S_h$ and $S_v$ denote the results of the Sobel filter for the horizontal and vertical direction, respectively. The edge energy map may be computed as follows:

$$E = \sqrt{S_h^2 + S_v^2} \quad (1)$$

Figure 5:
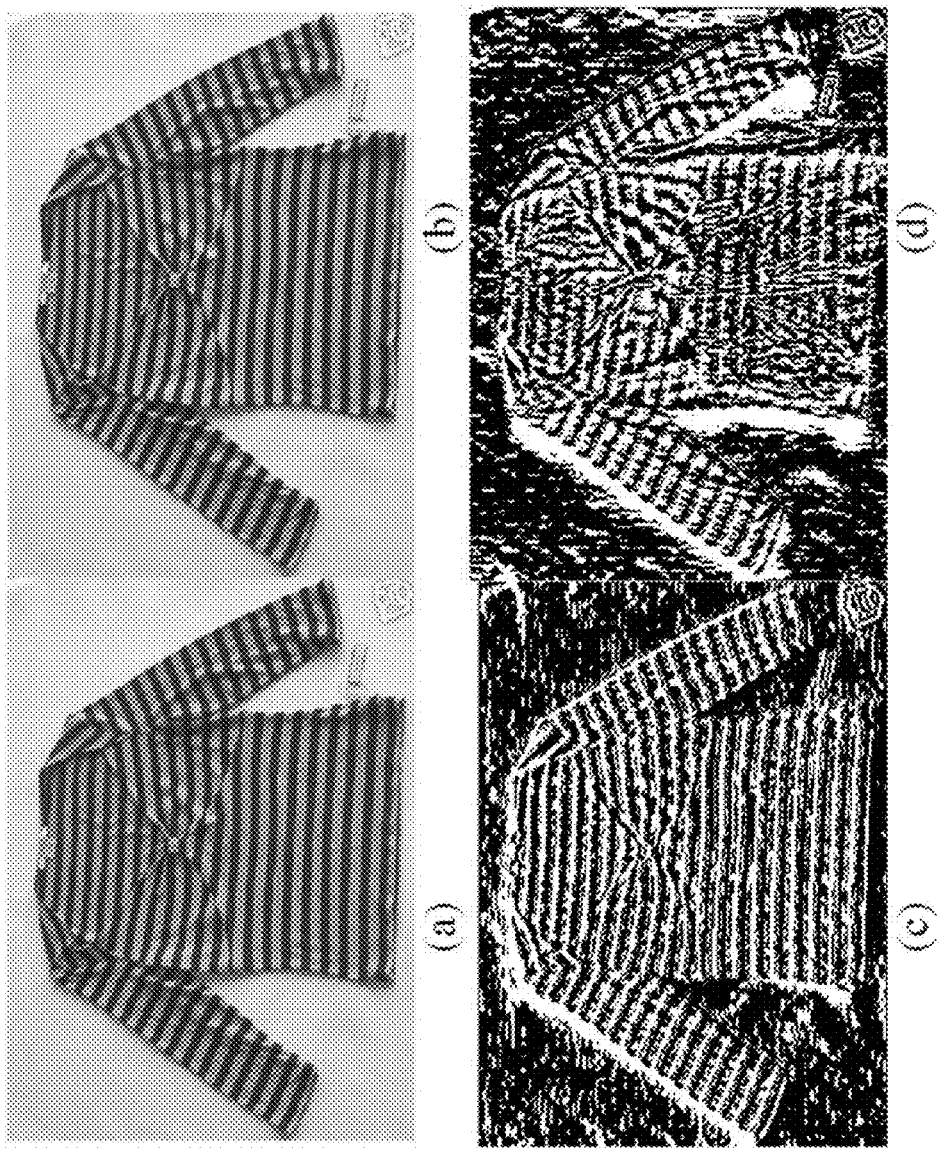
FIG. 5 is a set of example images that demonstrate image processing operations, according to some example embodiments.

FIG. 5 shows (a) the original image, (b) the image transformed to a gray image, and the results of the (c) horizontal and (d) vertical Sobel filters.

Weight for each patch may be calculated by aggregating all the edge energy values within the patch:

$$W(i, j) = \sum_{q=(j-1)*w+1}^{\min(j*w,W)} \sum_{p=(i-1)*h+1}^{\min(i*h,H)} E(p, q), \quad (2)$$

where W and H are the width and height of the whole image, respectively. $w = \lfloor W/m \rfloor$ and $h = \lfloor H/m \rfloor$.

To emphasize the importance of areas with high density of edge, a smoothing parameter σ may be incorporated and used to compute the normalized Weighting Metric:

$$nW(i, j) = \frac{w(i, j)^\sigma}{\sum_{i=1}^{m} \sum_{j=1}^{m} W(i, j)^\sigma} \quad (3)$$

Figure 6:
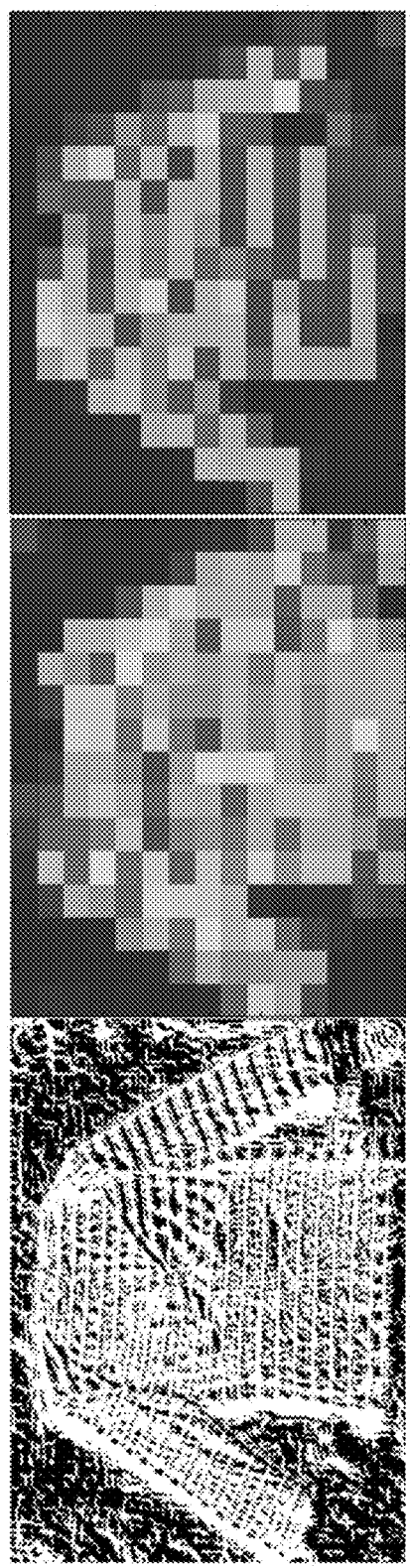
FIG. 6 shows an edge energy map, weight map, and a normalized weight map, according to some example embodiments.

FIG. 6 shows an edge energy map, weight map, and a normalized weight map with σ=3.

The final blur score may be computed by weighting the blur score from each patch by this normalized Weighting Metric:

$$\text{WeightedBlur} = \sum_{i=1}^{m} \sum_{j=1}^{m} \text{Blur}(i,j) \times nW(i,j) \quad (4)$$

$$\text{Sharpness} = 1 - \sum_{i=1}^{m} \sum_{j=1}^{m} \text{Blur}(i,j) \times nW(i,j) \quad (5)$$

2.1 Blur Detector

The obtained sharpness score ranges from 0 to 1, where 1 indicates a sharp image and 0 indicates the blurriest image. However, the output of the sharpness score follows a Gaussian distribution. To properly digest this quantitative result, the computed sharpness score may be modeled and converted to the probability of images being blurred (also referred to as a probability of blur or probability of blur score).

$$P_{blur} = \begin{cases} \frac{(1-\alpha)*(WeightedBlur-\beta)}{(1-\beta)} + \alpha & \text{if } WeightedBlur \geq \beta \\ \alpha - \frac{\alpha*(\beta-WeightedBlur)}{\beta} & \text{otherwise} \end{cases} \quad (6)$$

where α and β are two parameters used in the function that maps sharpness score space to probability space. This probability score helps to interpret the sharpness score in a more user-friendly manner. When a user uploads an image, the probability score provides the user with a sense of how sharp his image is relative to the actual distribution of sharp or blurred images that have been previously uploaded for a given category of images (e.g., in the example shown in FIG. 4, the category may be apparel that are tops). The greater the blur, the greater the probability score within a given range, such as between 0 and 1. Each category of images (e.g., tops, pants, jeans, coats, sweaters, gloves, hats, sheets, etc.) may have its own actual distribution of sharpness or blurred images that have been previously uploaded. The distribution for a given category of images may cause different α parameters, β parameters, or both, to be used relative to other categories of images. For example, even though a sharpness score is calculated as 0.47, which on the range of 0 to 1 seems fairly blurry, if all the images in the same category range between a sharpness score of 0.2 to 0.5, then 0.47 maybe considered to be a sharp image given the actual image distribution for that category. Conversely, the same value of 0.47 may be considered to be blurry if all the images in the given category range between 0.35 to 0.9.

Also, a blur detector (e.g., within the sharpness evaluation machine) may be built based on $P_{blur}$. Images with $P_{blur} > p$ may be flagged as blurred, thus providing users a warning to prevent them from retaining uploaded blurred images which are visually annoying or not informative.

Figure 7:
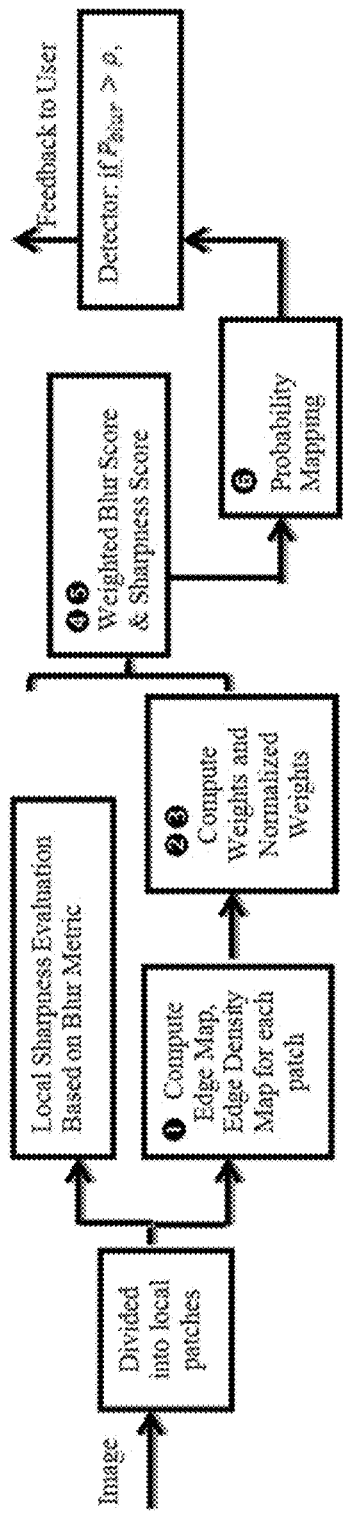
FIG. 7 is a flowchart that illustrates an example method of image processing, according to some example embodiments.

FIG. 7 is a flowchart that illustrates an example method of analyzing image sharpness or blurriness, converting a sharpness score into a probability score, and comparing the probability score against a pre-determined blur threshold in order to flag the image as being too blurry for the user.

3. Experimental Results

The above scheme may be applicable to two data sets. The first data set may be a public database for subjective quality evaluation. For example, the first data set may be or include the Categorical Subjective Image Quality (CSIQ) database. This data set may contain a wide variation of image distortions. In some example embodiments, only the blurred subset is used.

Figure 8:
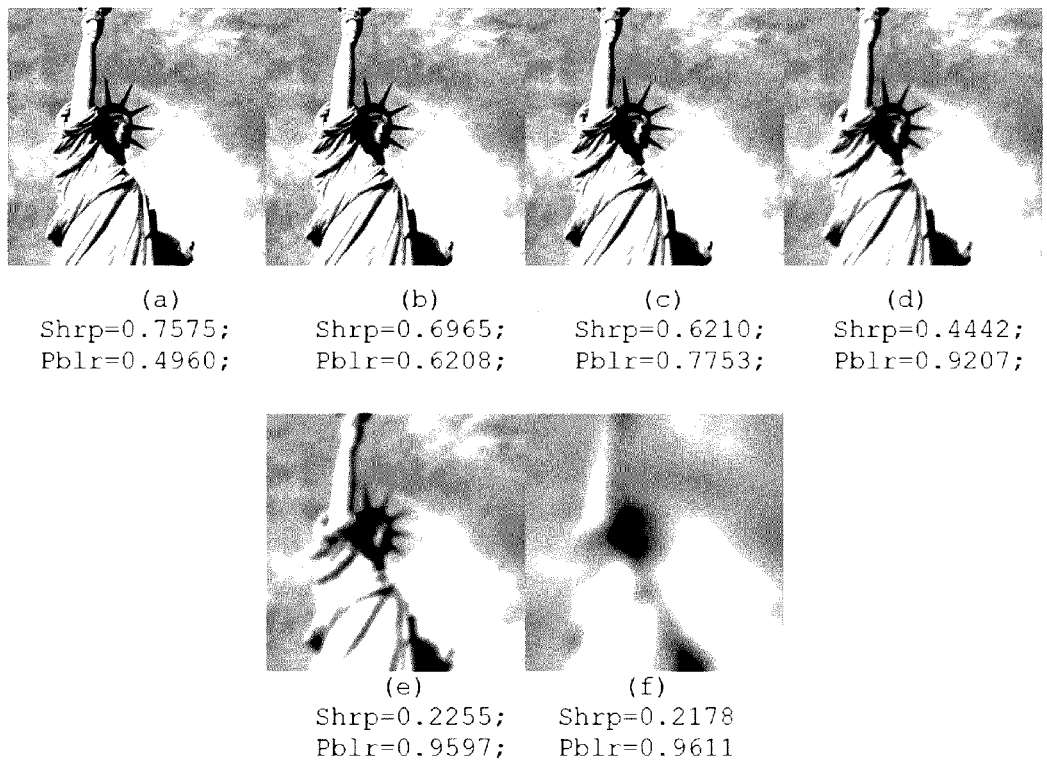
FIGS. 8 and 9 are sets of example images presented with their respective sharpness scores and blur probabilities, according to some example embodiments.
Figure 9:
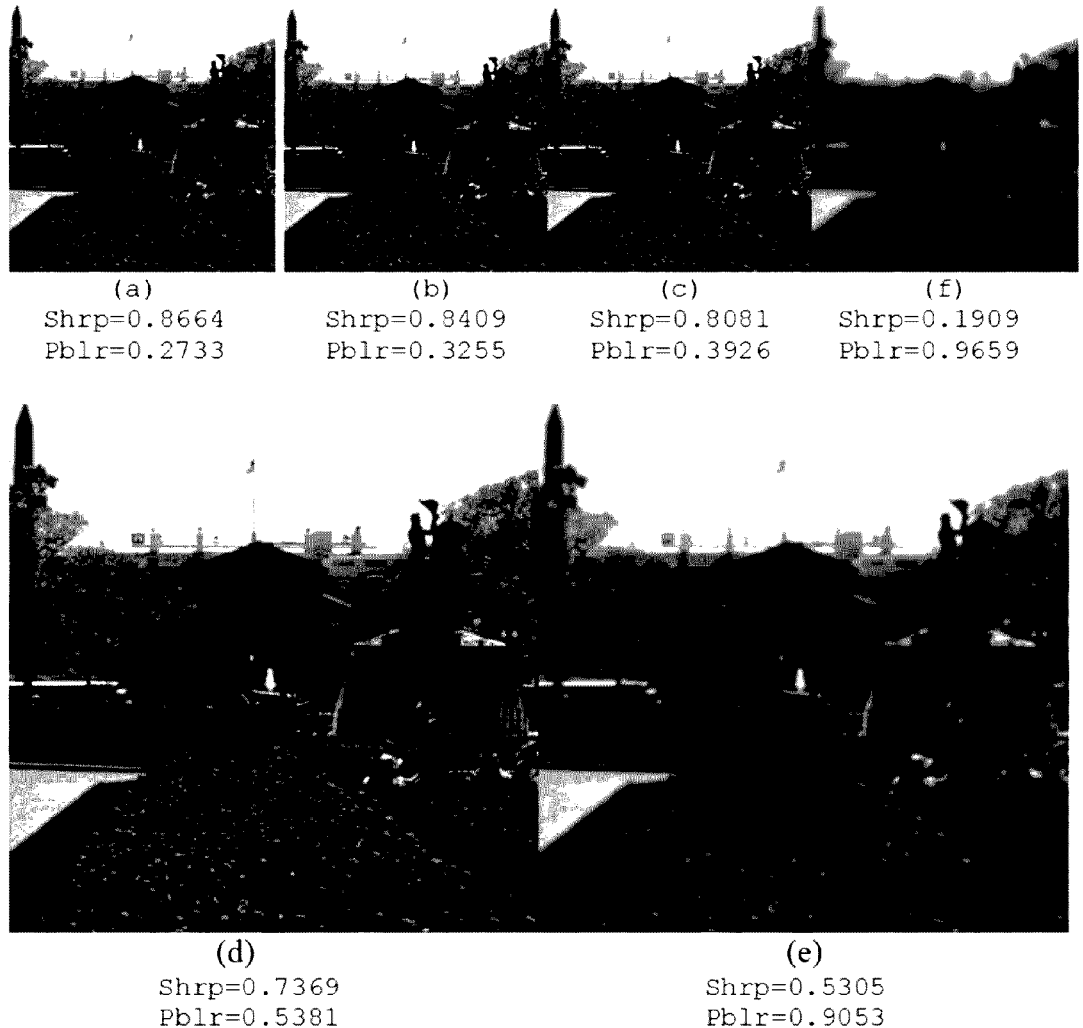

FIGS. 8 and 9 show the obtained sharpness score and blur probability, denoted as "Shrp" and "Pblur" respectively. Parameters for calculating blur probability is set to empirical values as $\alpha=0.9$ and $\beta=0.44$. For each figure, the ground truth sharpness level is (a)>(b)>(c)>(d)>(e)>(f). It can be seen that the images are correctly ranked for sharpness using the above scheme. In particular, comparing images (d) and (e) in FIG. 8, it can be seen that image (e) of FIG. 8 is significantly visually annoying due to the blur distortion, while image (d) of FIG. 8 is less so and thus visually acceptable. The proposed detector results in 0.5381 and 0.9053 as the probability of blur, which demonstrates the ability of predicting blurring effect that matches (or is more user-friendly with) the human vision.

Figure 10:
FIG. 10 is a set of four images taken from one listing object, with respective estimated sharpness levels and probabilities of blur, according to some example embodiments.
Figure 10:
Figure 11:
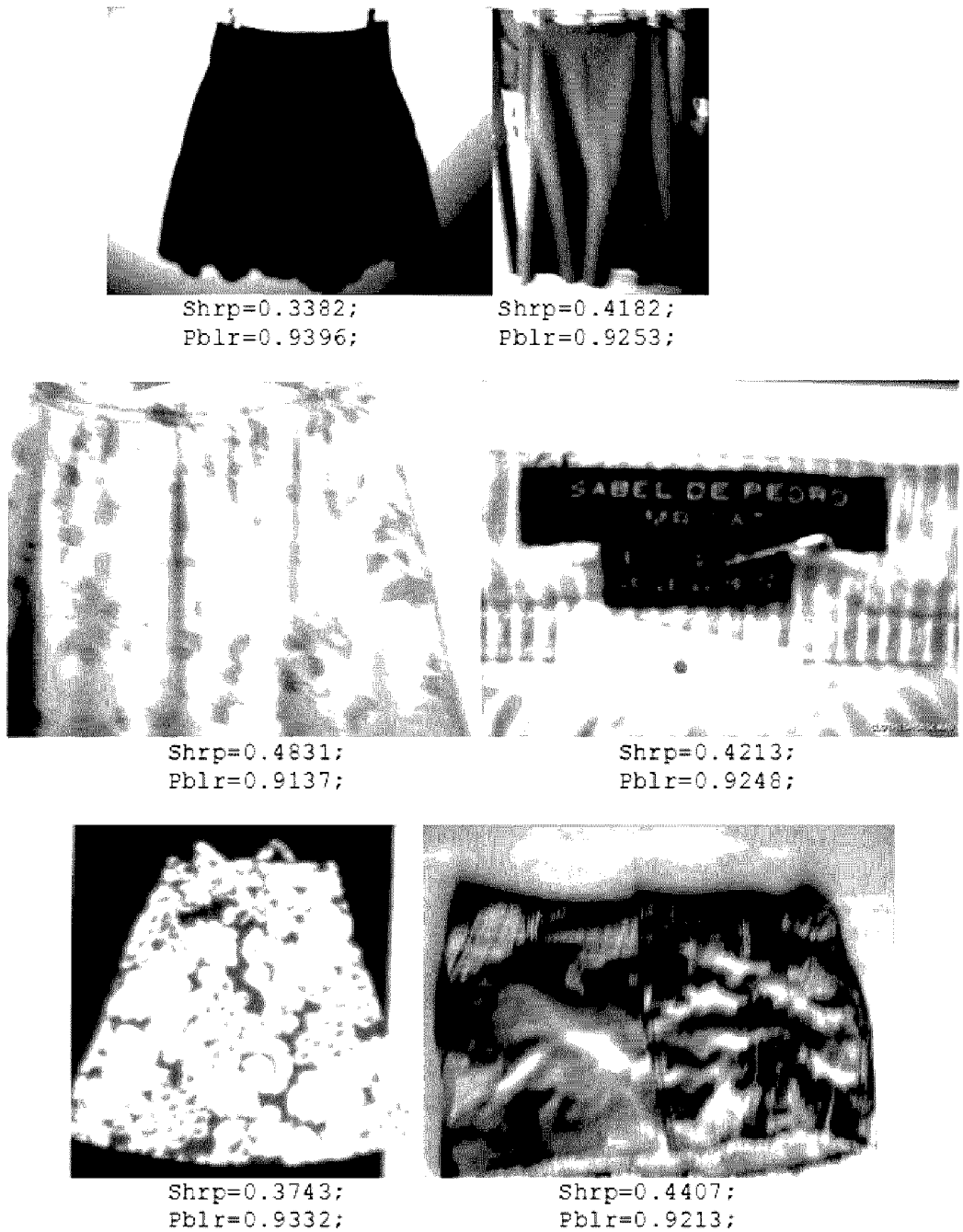
FIG. 11 shows several example images from a women's clothing category, with respective estimated sharpness levels and probabilities of blur, according to some example embodiments.

The second data set may be taken from an online e-commerce site (e.g., eBay.com). For example, the second data set may be or include 194,279 images from a women's clothes category with great variation. For each listing, sellers often upload one or multiple images taken from the same object. FIG. 10 shows the estimated sharpness level and probability of blur for four images taken from one listing object. FIG. 10 shows that the above-described approach is able to correctly predict the blur distortion and even discriminate between fairly fine images. The upper right image is the sharpest image from among the set of four images, having the lowest probability of blur value. FIG. 11 shows several example images from the women's clothing category. As illustrated in FIG. 11, the above-described approach successfully detects blurred images, which can be further used to flag the image, and give warnings to the seller to help him improve the image quality.

In order to incorporate image content in the blur or sharpness evaluation, an image with a larger portion of solid region contains less high frequency signals, thus tending to result in false alarms. In order to evaluate the improvements from using the above-described scheme, images that are the most blurred are analyzed, and the problem is treated as a ranking problem, e.g., to generate the right ranking for images in terms of their blur level. This setting also facilitates building a sharpness evaluation system (e.g., sharpness evaluation machine) that can flag blurred images to help the user. Therefore, a total of 9,313 images from the original 194 k dataset may be used. These images may be the most blurred as compared to the rest of the images. Because of the complexity of the data and the limitations of human perception, to obtain an absolute ranking for images in terms of the blurring degree may be very difficult. Therefore, instead of ranking each individual image, it may be reasonable to separate the data into two sets with different levels of blur that is still discriminative by human vision.

In some example embodiments of the sharpness evaluation system, each of the 9,313 most blurred images is manually checked, and these images are split into two sets: positive set and negative set. The positive set may consist of images that are relatively more blurred than the negative set. For example, the positive set $\phi_{pos}$ may consist of 8,241 images, and the negative set $\phi_{neg}$ may consist of 1,072 images. The manual classification of images into the two sets may be compared to determine whether the above-described approach can better discriminate this two-level data set. This may be a much harder problem, since discriminating between blurred and sharp images is much easier than discriminating between all blurry images.

A standard evaluation metric for ranking may be used to analyze the performance of different algorithms, such as, but not limited to, the normalized discounted cumulative gain (nDCG). DCG makes two assumptions: that highly relevant items (in our case, most blurred images from the positive set) are more useful when appearing earlier in the rank; and that they are also more useful than marginally relevant items (less blurred images from the negative set), which are in turn more useful than irrelevant items (sharp images). The DCG value at position p is computed by:

$$DCG_p = \sum_{i=1}^{p} \frac{2^{rel_i} - 1}{\log_2(i+1)}, \quad (7)$$

where $rel_i=1$ if image $I_i \in \phi_{pos}$, else $rel_i=0$ if image $I_i \in \phi_{neg}$. However, DCG depends on the length of results and position. To remove this effect, DCG at each chosen position p is normalized by the ideal DCG:

$$nDCG_p = \frac{DCG_p}{IDCG_p}. \quad (8)$$

A perfect ranking produces an $nDCG_p$ of 1.0. All nDCG are relative values on the interval 0.0 to 1.0.

Each image may be converted to a gray image (e.g., grayscale image) and divided into multiple patches (m=15). In addition to the baseline algorithm BlurMetric, it may be helpful to compare the above-described WeightedBlur algorithm (with various σ) with other two algorithms: BetaBlur and TopBlockBlur. BetaBlur uses a simple smoothing schema ($\beta=4$ in the experiment):

$$BetaBlur = BlurMetric \times \frac{\log\left(\sum_{i=1}^{m}\sum_{j=1}^{m} W(i,j)\right)}{\beta + \log\left(\sum_{i=1}^{m}\sum_{j=1}^{m} W(i,j)\right)}, \quad (9)$$

TopBlockBlur averages blur values Blur(i,j) from the top patches that have the highest weights W(i,j). In some example embodiments, it averages the top ⅓ patches.

Figure 12:
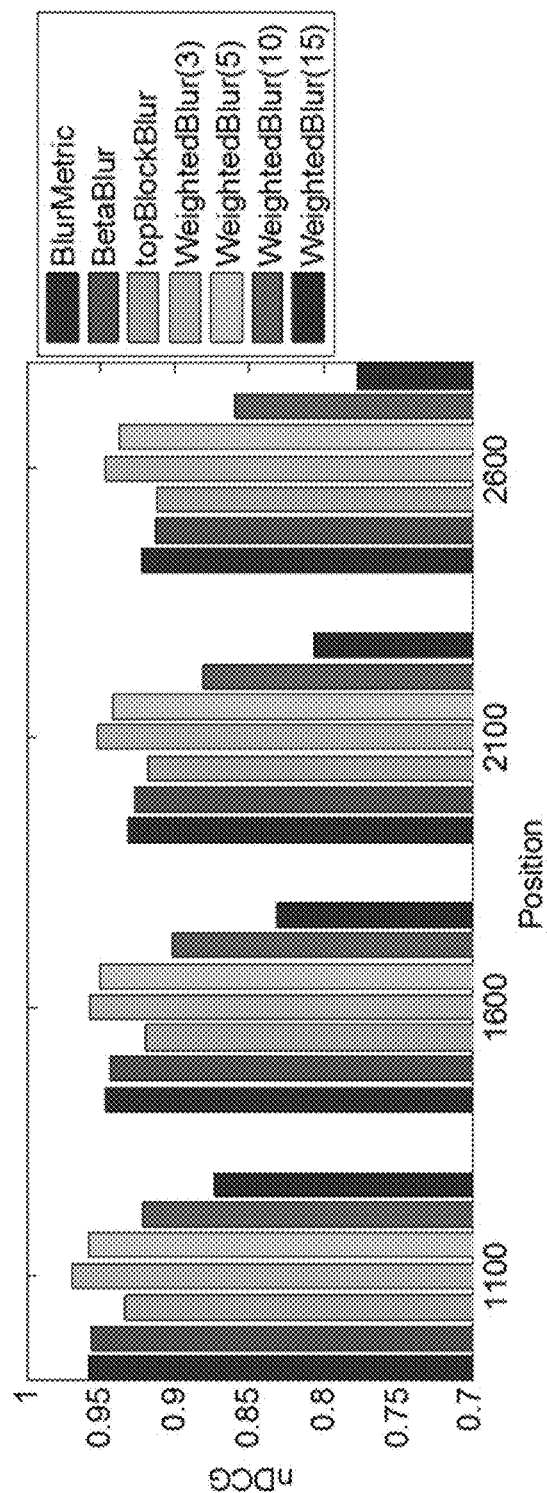
FIG. 12 is a bar plot of experimental data comparing multiple algorithms, according some example embodiments.

FIG. 12 shows a bar plot of computed nDCG at several top positions (p=1100, 1600, 2100, 2600) for different approaches. It can be seen from FIG. 12 that the proposed WeightedBlur metric (with σ=3,5) is consistently better than the baseline approach (Blur Metric) and other two methods (BetaBlur and TopBlockBlur). Increasing a forces the algorithm bias to focus on the edge region.

4. Image Diagnosis & Seller Assistant System

Based on the above-described approach, two systems (e.g., a Web version and a mobile version) may be implemented to guide the user (e.g., seller) during the photo uploading process. When a user uploads an image, the image is sent to the server API (or directly computed on the user device) to evaluate its sharpness quality. Results for sharpness are then returned to the user and are displayed using a user-friendly meter or grading. For images with high probability of being blurred, the user receives a pop up window of a warning sign (or other notification format) and is asked to improve the image quality by using photo-editing tools on their device or to take and upload another image. In some embodiments, photo-editing tools may be inadequate to address blurriness in the current uploaded image, in which case taking another photo may be desirable.

Figure 13:
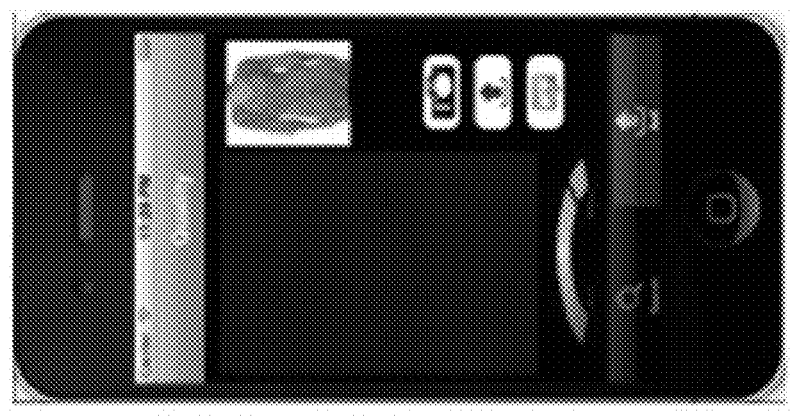
FIGS. 13 and 14 are conceptual diagrams that depict instant feedback being provided to the user in response to an uploaded image, according to some example embodiments.
Figure 13:
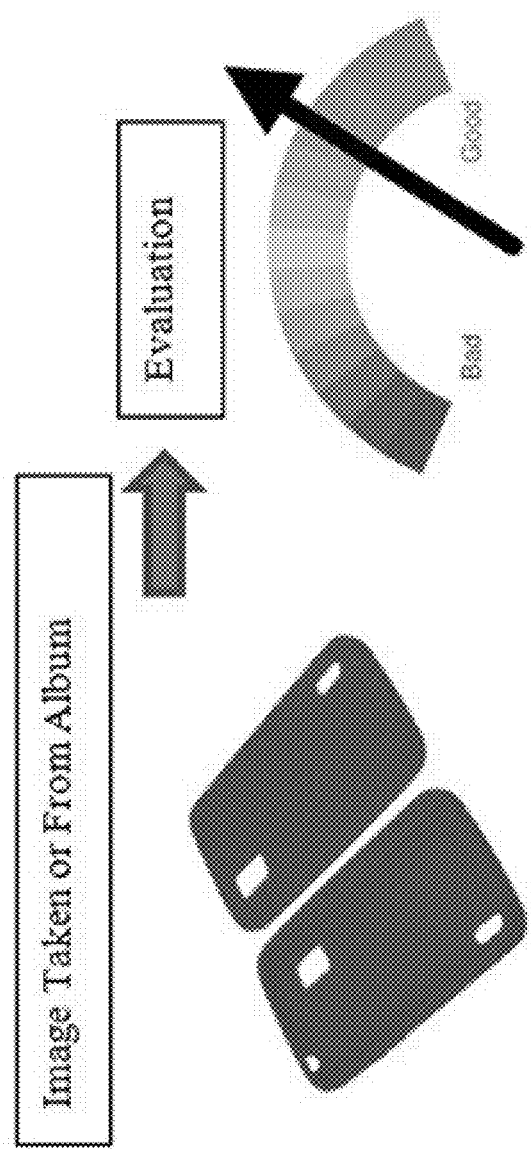
Figure 14:
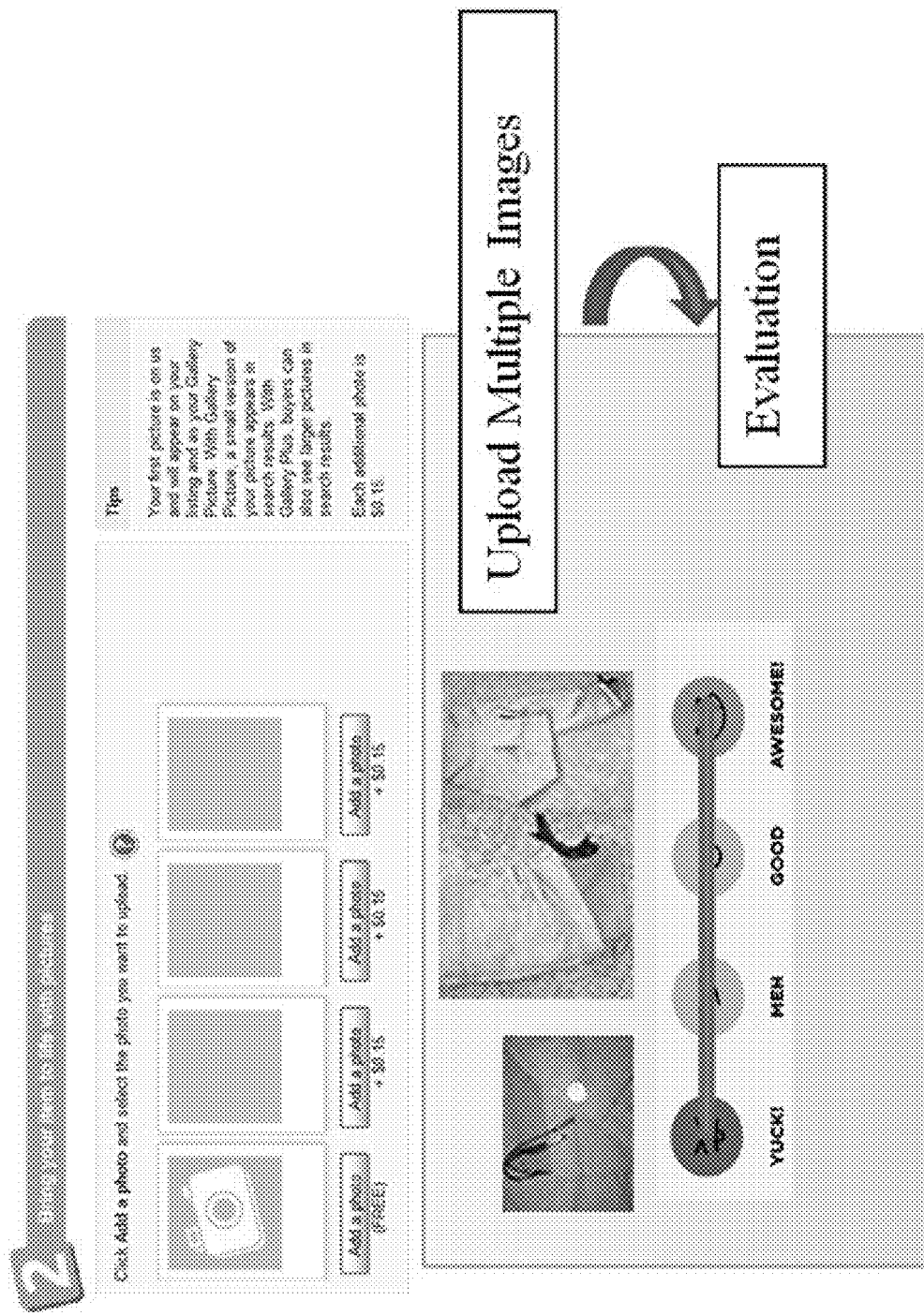
Figure 15:
FIG. 15-19 are example screenshots of uploaded images and image sharpness evaluation results returned to the user, according to some example embodiments.
Figure 15:
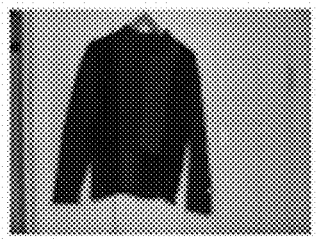
Figure 15:
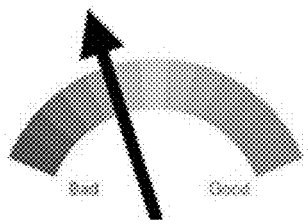
Figure 16:
Figure 16:
Figure 16:
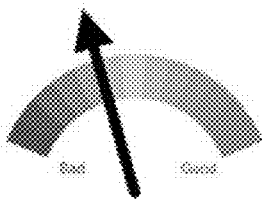
Figure 17:
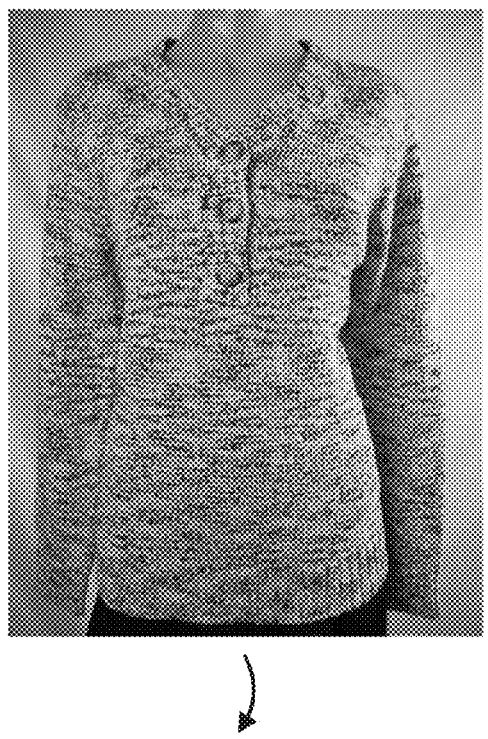
Figure 17:
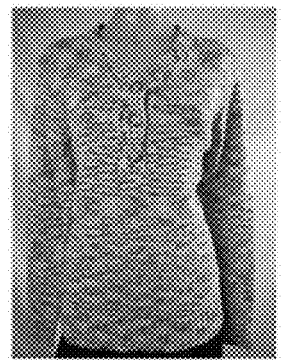
Figure 17:
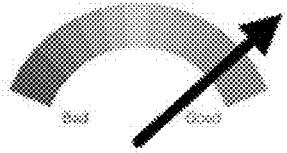
Figure 18:
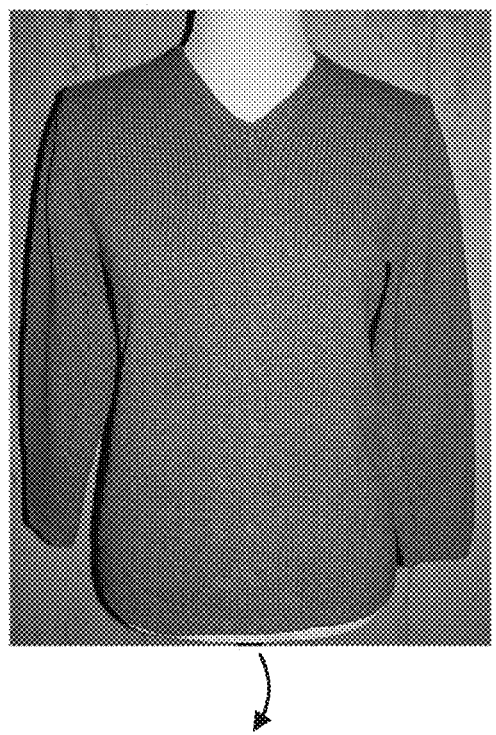
Figure 18:
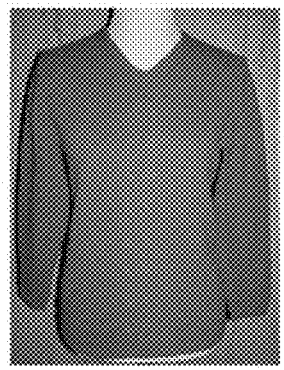
Figure 18:
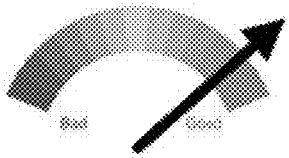
Figure 19:
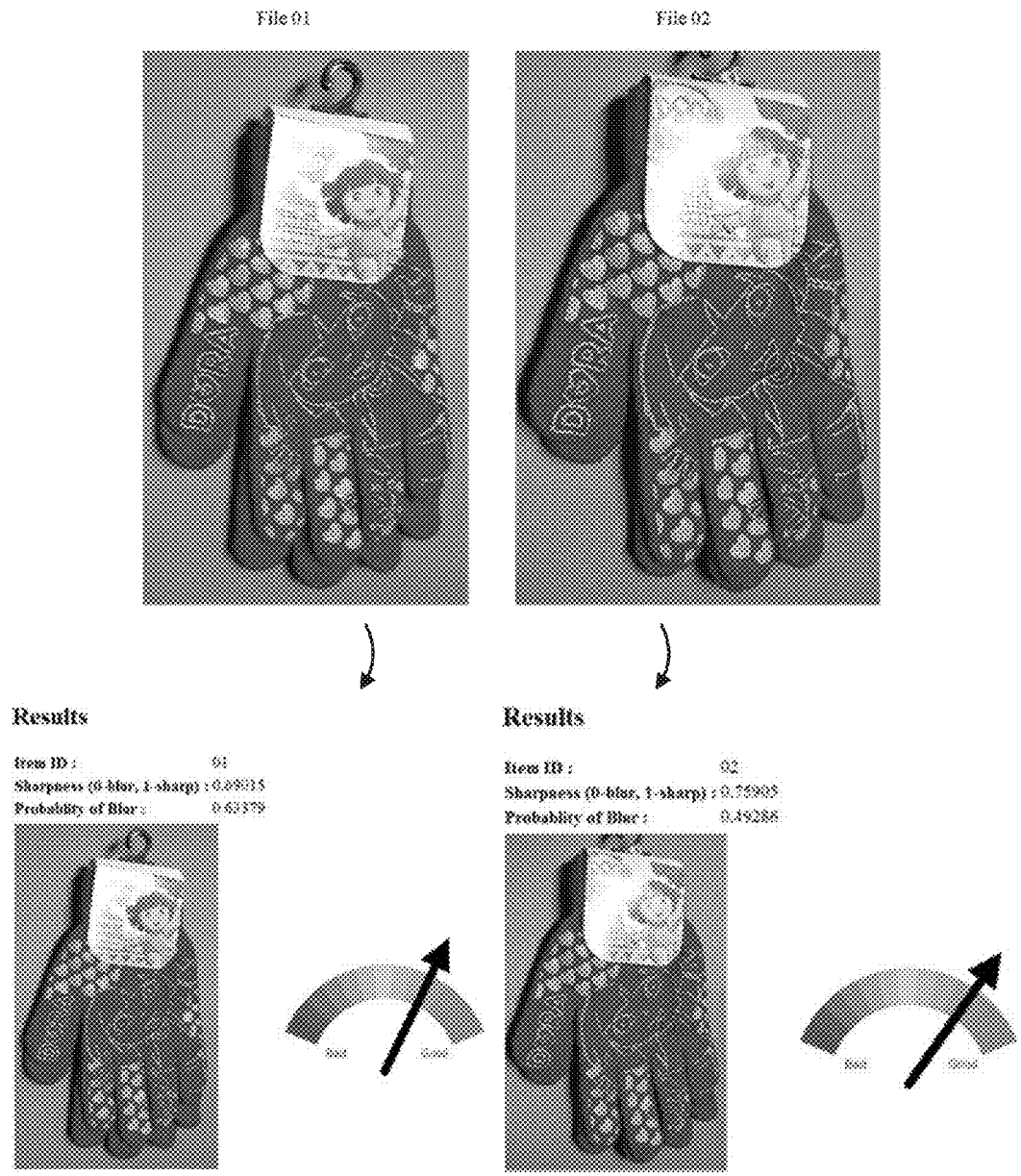

FIGS. 13 and 14 are conceptual diagrams showing instant feedback being provided to the user in response to an uploaded image in a mobile and a web context, respectively, according to some example embodiments.

In the mobile context, as shown in FIG. 13, with each image taken by the mobile camera or uploaded from the photo album, the networked system 102 helps the user (e.g., seller) to evaluate sharpness quality and provide them instant feedback. The user can then decide whether to take another picture for their listing product.

In the web context (accessed on a desktop or laptop or via the website), as shown in FIG. 14, multiple images of a product may be uploaded simultaneously by the user (e.g., seller) for a given listing. The networked system 102 helps the seller to evaluate all these images, to select the sharpest image from the set of uploaded images. If all of the images fall below the blur threshold, then the networked system 102 may provide a warning, recommendation, or other notification to take another photo, apply a photo editing tool, or the like.

FIG. 15-19 show example screenshots of uploaded images and image sharpness evaluation results returned to the user, according some example embodiments. The image sharpness evaluation results may include, but are not limited to, an item identifier (ID) that uniquely identifies an item to be listed, a sharpness score between 0 and 1, a corresponding probability of blur score, and a graphical indicator of how "good" (sharp) or "bad" (blurred) the image is. Any one or more of the image sharpness evaluation results shown in FIG. 14-18 may be presented in the mobile context, web context, or both (e.g., as part of a seller assistant scheme).

In this manner, a content-aware image sharpness evaluation scheme, involving edge oriented Weighted Blur Metric and probability modeling of the image sharpness, is disclosed herein. Application of the above-described scheme to various data sets produced better detection of the sharpness level and improved sharpness/blur detection results. Using the scheme, a mobile system or a web-based system may be configured to provide a user that uploads one or more photos of an object (e.g., a product to be listed in an e-commerce site or marketplace) instant feedback as to the quality of the uploaded photos. The feedback may comprise one or more indicators (e.g., numerical, graphical, etc.) to educate the user quantitatively as to the blurriness of the photo. The system may additionally provide recommendations or notifications to take and upload an alternative photo, edit the uploaded photo, or select the sharpest photo from among the set of uploaded photos for a given object.

The following references are incorporated in their entirety herein:

Chandler, E. C. (2009). Most apparent distortion: a dual strategy for full-reference image quality assessment. *SPIE*.

Crete, F. (2007). The Blur Effect: Perception and Estimation with a New No-Reference Perceptual Blur Metric. *SPIE Electronic Imaging Symposium Conf Human Vision and Electronic Imaging*.

Karam, N. D. (2010). An Improved No-Reference Sharpness Metric Based on the Probability of Blur Detection. *International Workshop on Video Processing and Quality Metrics for Consumer Electronics (VPQM)*.

N. D. Narvekar and L. J. Karam. (2009). A No-Reference Perceptual Image Sharpness Metric Based on a Cumulative Probability of Blur Detection. *International Workshop on Quality of Multimedia Experience (QoMEX)*, (pp. 87-91).

Z. Wang, H. R. (2002). No-reference perceptual quality assessment of JPEG compressed images. *IEEE Int. Conf Image Proc*.

In another example embodiment, the quality of product listings is improved by upgrading the images posted by the seller. A seller can take a picture of an item, upload the image to the system (e.g., networked system 102) using a user device (e.g., device machine 110 or 112), the image is processed by the user device, the system, or both, and if the image is determined to be of low quality (e.g., below a pre-determined threshold), a stock image is used instead of the uploaded image for the product listing. Image processing may include analysis of the uploaded image to determine one or more image properties such as, but not limited to, low light, partial view, blurriness, color correctness, tint, and the like. Prior to replacement of the uploaded image with the stock image, one or more notifications and options may be presented to the seller. For example, a preview of the stock image is provided to the seller and seller approval is sought to use the stock image. As another example, the seller may be given the choice to upload a different image (and recommendations may be provided for taking a better photo of the item), rather than having the current uploaded image replaced with a stock image. As still another example, more than one stock image may be available in a library of stock images (e.g., maintained in databases 126), and the seller may choose from among the stock image choices corresponding to the item being listed. A stock image corresponding to the item may have corresponding metadata or item information so that the uploaded image can be matched to the stock image. Seller-side information such as, but not limited to, listing information (e.g., item name, item description, item specification, etc.), metadata included in the uploaded image, or both, can be used to match against item information associated with the stock images to identify one or more stock images that are suitable replacements for the uploaded image. As an example, after image sharpness has been analyzed and image quality results presented to the seller (such as shown in FIG. 14-18), determination of stock image availability may be performed if the quality of the uploaded image is below one or more pre-determined (blurriness) threshold. Identified stock images may be presented to the seller as potential replacements, for replacement approval, or as exemplars of better image quality to strive for when taking other photos of the item for upload to replace the current uploaded image.

5. Example Embodiments of Methods and Systems

Figure 20:
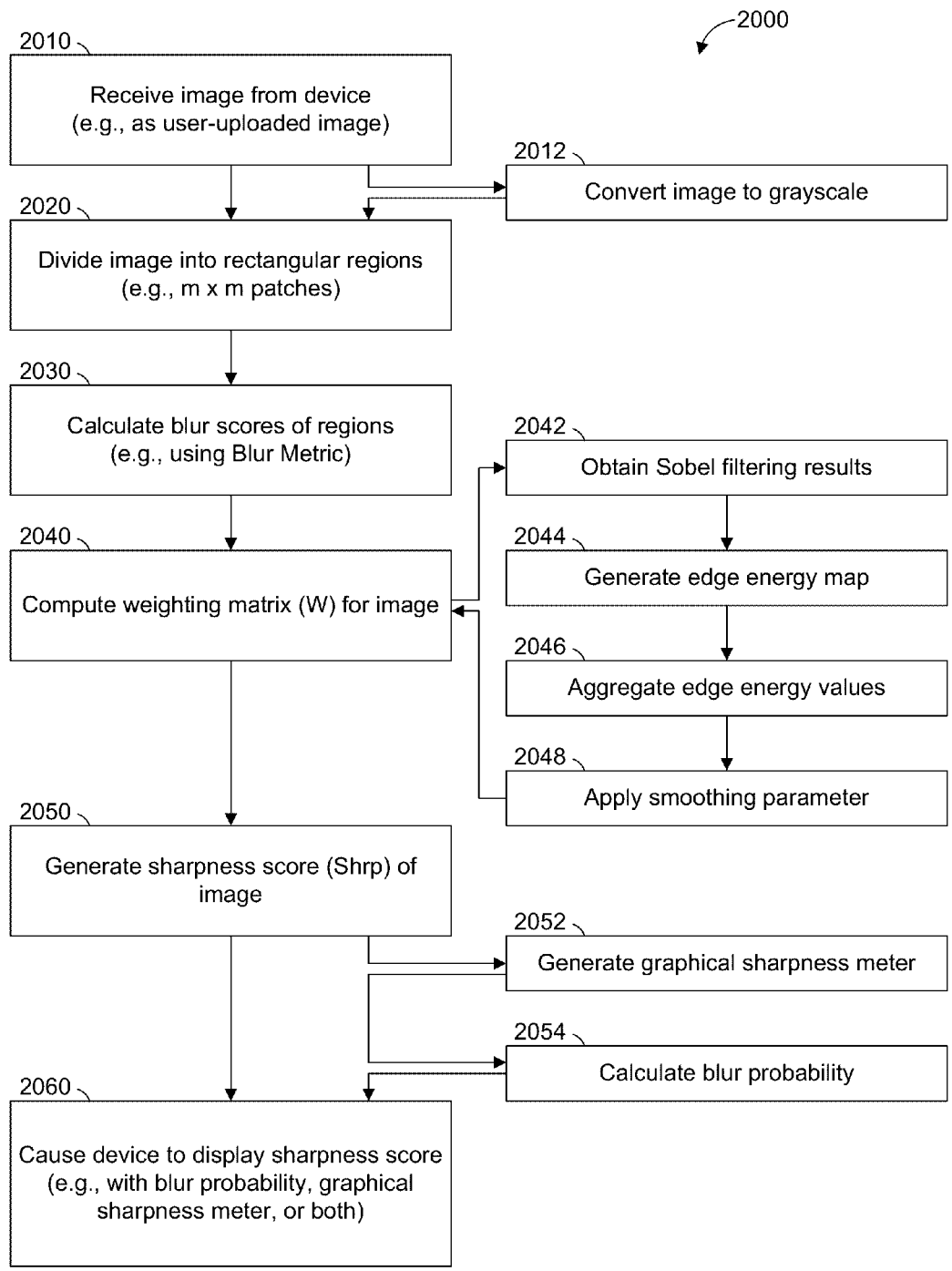
FIG. 20 is a flowchart illustrating operations of a networked system configured to evaluate image sharpness, according to some example embodiments.

FIG. 20 illustrates operations of the networked system 102 in performing a method 2000 of evaluating image sharpness, according to some example embodiments. Operations in the method 2000 are performed using modules described above with respect to FIG. 2 (e.g., image upload assistance engine 214 and image sharpness detection engine 212). As shown in FIG. 20, the method 2000 includes operations 2010, 2020, 2030, 2040, 2050, and 2060.

In operation 2010, the image upload assistance engine 214 receives an image from a device of a user. For example, the user may operate the device machine 110 to upload the image to the networked system 102, which may include the image upload assistance engine 214. As another example, the device machine 110 may include the image upload assistance engine 214 and receive the image at the device machine 110.

In operation 2020, the image sharpness detection engine 212 divides the received image into rectangular regions (e.g., patches). The rectangular regions may be equal in quantity along perpendicular axes (e.g., horizontal and vertical axes) of the image. As noted above, this may result in the image being divided into m×m (m²) patches.

In operation 2030, the image sharpness detection engine 212 calculates blur scores of the rectangular regions (e.g., patches) based on (e.g., in accordance with) a non-reference blur metric, which may be a non-reference perceptual blur metric, such as the Blur Metric discussed above. In particular, the non-reference blur metric may be used to calculate a blur score for each of the rectangular regions.

In operation 2040, the image sharpness detection engine 212 computes the weighting matrix W for the image. Computation of the weighting matrix W is based on two results of filtering image and perpendicular directions. As discussed above, for example, the two results may include a first result from Sobel filtering the image (e.g., in grayscale form) in a horizontal direction and a second result from Sobel filtering the image (e.g., in grayscale form) in a vertical direction.

In operation 2050, the image sharpness detection engine 212 generates a sharpness score (Shrp) of the image as a whole, based on application of the weighting matrix W (e.g., as calculated in operation 2040) to the blur scores of the rectangular regions (e.g., as calculated in operation 2030).

In operation 2060, the image upload assistance engine 214 causes the device of the user to display the sharpness score of the image (e.g., as generated in operation 2050). This may be performed in response to the receiving of the image in operation 2010. According to various example embodiments, the display of the sharpness score may be performed as illustrated in FIG. 15-19.

As shown in FIG. 20, the method 2000 may include operation 2012, which may be performed prior to operation 2020. In operation 2012, the image sharpness detection engine 212 converts the image to grayscale. As noted above, this may be performed according to a function in which the intensity (I) of each grayscale pixel equals 0.2985R+0.5870G+0.1140B, where R, G, and B represent red, green, and blue color components, respectively, of the corresponding image pixel within the image received in operation 2010. Performance of operation 2012 may result in the rectangular regions in operation 2020 being grayscale.

As also shown in FIG. 20, one or more of operations 2042, 2044, 2046, and 2048 may be performed as part (e.g., a precursor task, a subroutine, or a portion) of operation 2040, in which the weighting matrix W is computed. As discussed above with respect to operation 2040, capitation of the weighting matrix may be based on a first result (e.g., a first edge map) from Sobel filtering the image horizontally, and a second result (e.g., second edge map) from Sobel filtering the image vertically. In operation 2042, the image sharpness detection engine 212 obtains these first and second results (e.g., by separately applying Sobel filtering to the image in horizontal and vertical directions). Examples of such first and second results are discussed above with respect to FIG. 5.

In operation 2044, the image sharpness detection engine 212 generates an edge energy map based on the first and second results from operation 2042. Generation of the edge energy map may be performed in accordance with Equation 1, described above. An example of an edge energy map is discussed above with respect to FIG. 6.

In operation 2046, the image sharpness detection engine 212 aggregates edge energy values for each of the rectangular regions (e.g., patches) of the image. This may be done in accordance with Equation 2, described above. Performance of operation 2046 may result in generation of the weighting matrix W (e.g., in an initial, non-smoothed form).

In operation 2048, the image sharpness detection engine 212 applies a smoothing parameter a to the weighting matrix W such that the weighting matrix W becomes normalized with respect to regions (e.g., patches) with high edge density. This may be done in accordance with Equation 3, described above. According to various example embodiments, operation 2050 is performed using this normalized (e.g., smoothed) weighting matrix W. In such example embodiments, the sharpness score (Shrp) of the image may be calculated in accordance with Equations 4 and 5, as described above.

As further shown in FIG. 20, one or more of operations 2052 and 2054 may be performed as part of the method 2000. For example, one or both of operations 2052 and 2054 may be performed after the generation of the sharpness score in operation 2050 and before the display of the sharpness score in operation 2060.

In operation 2052, the image upload assistance engine 214 generates a graphical sharpness meter based on the sharpness score of the image (e.g., generated in operation 2050). As described above, such a graphical sharpness meter may indicate a relative sharpness of the image in relation to visual images (e.g., images previously received by the networked system 102). Examples of such a graphical sharpness meter are illustrated in FIG. 15-19. Accordingly, performance of operation 2060 may include causing the device 110 to display the sharpness score of the image with the generated graphical sharpness meter.

In operation 2054, the image sharpness detection engine 212 calculates a blur probability of the image based on the sharpness score of the image (e.g., generated in operation 2050). The blur probability may be calculated in accordance with Equation 6, described above. As discussed above with respect to Equation 6, the calculation of the blur probability may be based on one or more parameters (e.g., distribution parameters α and β) that are specific to an image category (e.g., apparel that are tops). Hence, the blur probability may represent how sharp an image is relative to an actual distribution of images previously uploaded for that given category of images. Accordingly, performance of operation 2060 may include causing the device 110 to display the sharpness score of the image with the blur probability of the image.

According to the methodologies discussed herein, the networked system 102 may benefit users by automatically detecting and quantifying image blurriness in uploaded images. The networked system 102 may also provide a selling assistant for e-commerce environments and accordingly guide potential sellers in real-time to improve the quality of images uploaded in connection with product listing creation. As noted above, a content-aware image sharpness evaluation scheme may be implemented in the networked system 102 to calculate the degree of sharpness or blur of photographs taken of objects of interest. In certain example embodiments, a calculated sharpness score from the image sharpness evaluation scheme is converted into a score that is meaningful relative to other photographs of the same category as the object depicted in the photograph.

In various example embodiments, a mobile-based assistant is configured to provide instant (or near instant) feedback to users uploading photographs using a mobile device. Such a mobile-based assistant may be implemented by the system, the mobile device, or combination of both. In alternative example embodiments, a web-based assistant is configured to provide instant (or near instant) feedback to users uploading one or more photographs simultaneously to an electronic commerce or marketplace website. Such a web-based assistant may be implemented by the system, a seller computer, or both. The feedback may include one or more indications of the blurriness of the uploaded photographs calculated using the image sharpness evaluation scheme and recommendations to improve the image quality. In some example embodiments, one or more stock images corresponding to the seller's uploaded image of an item is identified when the quality of the uploaded image is below a certain threshold. One or more of the stock images may replace the seller's uploaded image during creation of the product listing for the item.

Figure 21:
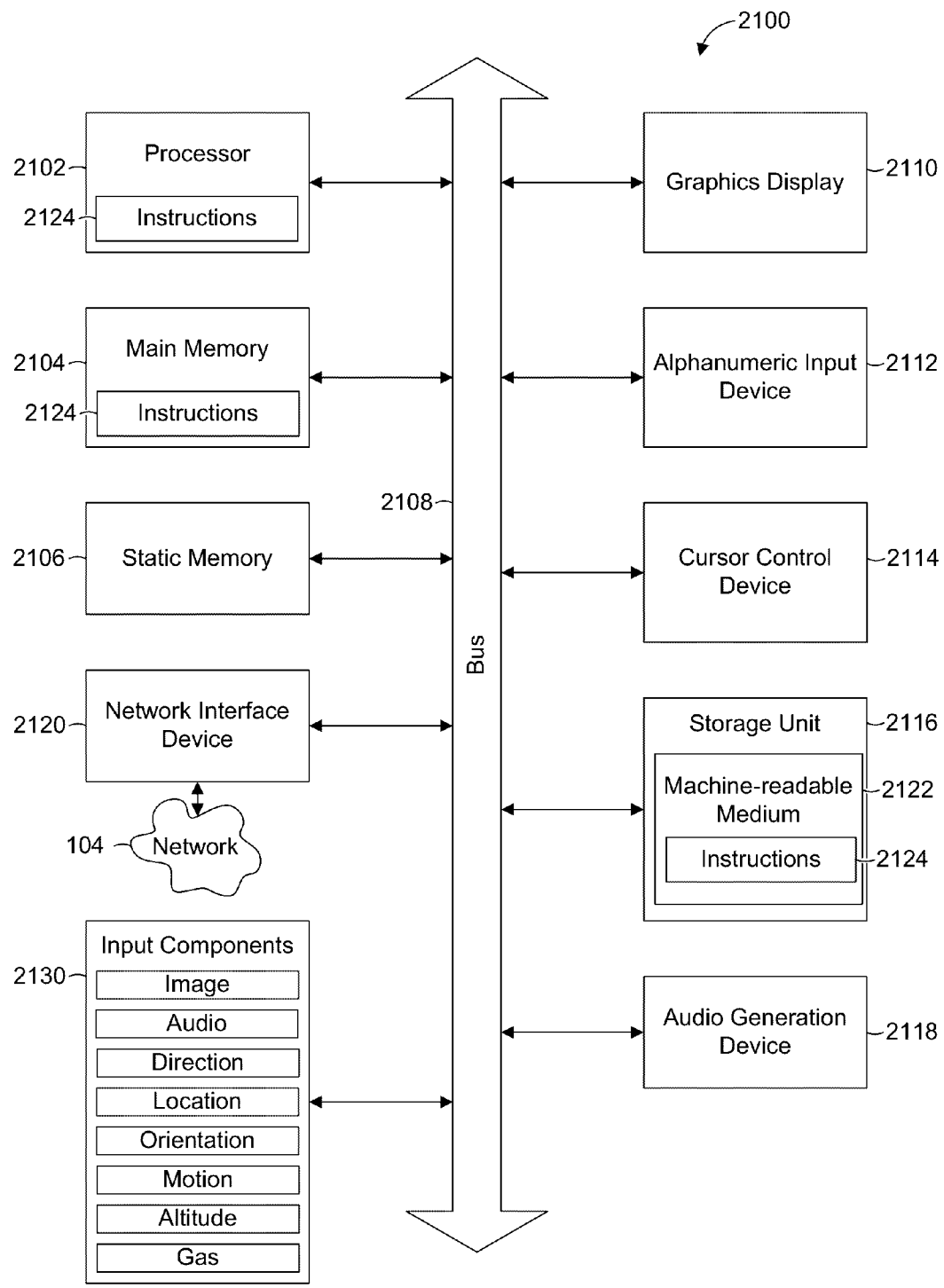
FIG. 21 is a diagrammatic representation of a machine in the example form of a computer system within which a set of instructions may be executed to cause the machine to perform any one or more of the methodologies discussed herein.

FIG. 21 is a block diagram illustrating components of a machine 2100, according to some example embodiments, able to read instructions 2124 from a machine-readable medium 2122 (e.g., a machine-readable storage medium, a computer-readable storage medium, or any suitable combination thereof) and perform any one or more of the methodologies discussed herein, in whole or in part. Specifically, FIG. 21 shows the machine 2100 in the example form of a computer system within which the instructions 2124 (e.g., software, a program, an application, an applet, an app, or other executable code) for causing the machine 2100 to perform any one or more of the methodologies discussed herein may be executed, in whole or in part. In alternative embodiments, the machine 2100 operates as a standalone device or may be connected (e.g., networked) to other machines. In a networked deployment, the machine 2100 may operate in the capacity of a server machine or a client machine in a server-client network environment, or as a peer machine in a distributed (e.g., peer-to-peer) network environment. The machine 2100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2124, sequentially or otherwise, that specify actions to be taken by that machine. Further, while only a single machine is illustrated, the term "machine" shall also be taken to include any collection of machines that individually or jointly execute the instructions 2124 to perform all or part of any one or more of the methodologies discussed herein.

The machine 2100 includes a processor 2102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2104, and a static memory 2106, which are configured to communicate with each other via a bus 2108. The processor 2102 may contain microcircuits that are configurable, temporarily or permanently, by some or all of the instructions 2124 such that the processor 2102 is configurable to perform any one or more of the methodologies described herein, in whole or in part. For example, a set of one or more microcircuits of the processor 2102 may be configurable to execute one or more modules (e.g., software modules) described herein.

The machine 2100 may further include a graphics display 2110 (e.g., a plasma display panel (PDP), a light emitting diode (LED) display, a liquid crystal display (LCD), a projector, a cathode ray tube (CRT), or any other display capable of displaying graphics or video). The machine 2100 may also include an alphanumeric input device 2112 (e.g., a keyboard or keypad), a cursor control device 2114 (e.g., a mouse, a touchpad, a trackball, a joystick, a motion sensor, an eye tracking device, or other pointing instrument), a storage unit 2116, an audio generation device 2118 (e.g., a sound card, an amplifier, a speaker, a headphone jack, or any suitable combination thereof), and a network interface device 2120.

The storage unit 2116 includes the machine-readable medium 2122 (e.g., a tangible and non-transitory machine-readable storage medium) on which are stored the instructions 2124 embodying any one or more of the methodologies or functions described herein. The instructions 2124 may also reside, completely or at least partially, within the main memory 2104, within the processor 2102 (e.g., within the processor's cache memory), or both, before or during execution thereof by the machine 2100. Accordingly, the main memory 2104 and the processor 2102 may be considered machine-readable media (e.g., tangible and non-transitory machine-readable media). The instructions 2124 may be transmitted or received over the network 104 via the network interface device 2120. For example, the network interface device 2120 may communicate the instructions 2124 using any one or more transfer protocols (e.g., hypertext transfer protocol (HTTP)).

In some example embodiments, the machine 2100 may be a portable computing device, such as a smart phone or tablet computer, and have one or more additional input components 2130 (e.g., sensors or gauges). Examples of such input components 2130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 2124 for execution by the machine 2100, such that the instructions 2124, when executed by one or more processors of the machine 2100 (e.g., processor 2102), cause the machine 2100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers." "numerals," or the like. These words, however, are merely convenient labels and are to be associated with appropriate physical quantities.

Unless specifically stated otherwise, discussions herein using words such as "processing," "computing," "calculating," "determining," "presenting." "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   a processor and executable instructions accessible on a non-transitory computer-readable medium that, when executed, cause the processor to perform operations comprising:
   receiving an image from a device of a user;
   causing the device of the user to display a sharpness score of the image as a response to the receiving of the image;
   dividing the image into rectangular regions that are equal in quantity along horizontal and vertical axes of the image;
   calculating blur scores of the rectangular regions that are equal in quantity along the horizontal and vertical axes of the image, the calculating of the blur scores of the rectangular regions being based on a non-reference blur metric;
   computing a weighting matrix for the image based on two results of filtering the image in perpendicular directions;
   generating the sharpness score of the image based on application of the weighting matrix to the blur scores of the rectangular regions;
   when the sharpness score of the image is below a certain pre-established threshold, identifying one or more stock images corresponding to an item represented in the image; and
   displaying the identified one or more stock images on the device of the user as a selectable substitute for the image.

2. The system of claim 1, wherein the executable instructions further cause the processor to perform operations comprising:
   generating an edge energy map from the two results of filtering the image in the perpendicular directions; and
   computing the weighting matrix based on the edge energy map.

3. The system of claim 2, wherein:
   the edge energy map quantifies edge energy values for each of the rectangular regions that are equal in quantity along the horizontal and vertical axes of the image; and
   the executable instructions further cause the processor to perform operations comprising aggregating the edge energy values for each of the rectangular regions.

4. The system of claim 1, wherein the executable instructions further cause the processor to perform operations comprising:
   calculating a blur probability of the image based on the sharpness score of the image and based on a distribution parameter specific to an image category that includes the image; and wherein the causing of the device to display the sharpness score causes the device to display the sharpness score with the blur probability of the image.

5. A method comprising:
   receiving an image from a device of a user;
   dividing the image into rectangular regions that are equal in quantity along horizontal and vertical axes of the image;
   calculating blur scores of the rectangular regions that are equal in quantity along the horizontal and vertical axes of the image,
   the calculating of the blur scores of the rectangular regions being based on a non-reference blur metric;
   computing a weighting matrix for the image based on two results of filtering the image in perpendicular directions;
   generating a sharpness score of the image based on application of the weighting matrix to the blur scores of the rectangular regions, the generating of the sharpness score being performed by a processor of a machine;
   causing the device of the user to display the sharpness score of the image as a response to the receiving of the image;
   when the sharpness score of the image is below a certain pre-established threshold, identifying one or more stock images corresponding to an item represented in the image; and
   displaying the identified one or more stock images on the device of the user as a selectable substitute for the image.

6. The method of claim 5, wherein the causing of the device to display the sharpness score causes the device to display the sharpness score with a graphical sharpness meter that indicates a relative sharpness of the image in relation to a plurality of additional images.

7. The method of claim 6 further comprising generating the graphical sharpness meter based on the sharpness score of the image.

8. The method of claim 5 further comprising:
   converting the received image to grayscale prior to the dividing of the image into the rectangular regions, and wherein the dividing of the grayscale image results in the rectangular regions being grayscale.

9. The method of claim 5, wherein the converting of the received image to grayscale is performed according to a function in which the intensity of each grayscale pixel equals $0.2985R+0.5870G+0.1140B$, where R, G, and B represent red, green, and blue color components of the corresponding image pixel.

10. The method of claim 5, wherein:
    the computing of the weighting matrix includes:
       obtaining a first result by Sobel filtering the image horizontally; and
       obtaining a second result by Sobel filtering the image vertically; and
    the first and second results are the two results on which the computing of the weighting matrix is based.

11. The method of claim 5, wherein:
the computing of the weighting matrix includes generating an edge energy map from the two results of filtering the image in the perpendicular directions; and
the weighting matrix is computed based on the edge energy map.

12. The method of claim 11, wherein:
the edge energy map quantifies edge energy values for each of the rectangular regions that are equal in quantity along the horizontal and vertical axes of the image; and
the computing of the weighting matrix includes aggregating the edge energy values for each of the rectangular regions.

13. The method of claim 5, wherein the computing of the weighting matrix includes applying the weighting matrix to the blur scores of the rectangular regions that are equal in quantity along the horizontal and vertical axes of the image.

14. The method of claim 5, wherein the computing of the weighting matrix is based on a smoothing parameter applicable to normalize the weighting matrix with respect to edge densities.

15. The method of claim 5 further comprising:
calculating a blur probability of the image based on the sharpness score of the image; and wherein
the causing of the device to display the sharpness score causes the device to display the sharpness score with the blur probability of the image.

16. The method of claim 15, wherein the calculating of the blur probability is based on a distribution parameter specific to an image category that includes the image.

17. The method of claim 15, wherein the blur probability represents a degree of relative sharpness of the image in relation to a plurality of further images previously received.

18. A non-transitory machine-readable storage medium comprising instructions that, when executed by one or more processors of a machine, cause the machine to perform operations comprising:
receiving an image from a device of a user;
dividing the image into rectangular regions that are equal in quantity along horizontal and vertical axes of the image;
calculating blur scores of the rectangular regions that are equal in quantity along the horizontal and vertical axes of the image, the calculating of the blur scores of the rectangular regions being based on a non-reference blur metric;
computing a weighting matrix for the image based on two results of filtering the image in perpendicular directions;
generating a sharpness score of the image based on application of the weighting matrix to the blur scores of the rectangular regions;
causing the device of the user to display the sharpness score of the image as a response to the receiving of the image;
when the sharpness score of the image is below a certain pre-established threshold, identifying one or more stock images corresponding to an item represented in the image; and
displaying the identified one or more stock images on the device of the user as a selectable substitute for the image.

19. The non-transitory machine-readable storage medium of claim 18, wherein:
the computing of the weighting matrix includes generating an edge energy map from the two results of filtering the image in the perpendicular directions; and
the weighting matrix is computed based on the edge energy map.

20. The non-transitory machine-readable storage medium of claim 18, wherein the operations further comprise:
calculating a blur probability of the image based on the sharpness score of the image; and wherein
the causing of the device to display the sharpness score causes the device to display the sharpness score with the blur probability of the image.

* * * * *